(12) United States Patent
Lee et al.

(10) Patent No.: US 8,530,113 B2
(45) Date of Patent: Sep. 10, 2013

(54) ELECTRODE CATALYST FOR FUEL CELL COMPRISING PALLADIUM AND IRIDIUM, METHOD OF PREPARING ELECTRODE CATALYST, AND FUEL CELL USING ELECTRODE CATALYST

(75) Inventors: Kang-hee Lee, Suwon-si (KR); Chan-ho Pak, Seoul (KR); Kyung-jung Kwon, Suwon-si (KR); Seon-ah Jin, Pocheon-si (KR); Dae-jong Yoo, Seoul (KR); Jong-won Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 335 days.

(21) Appl. No.: 12/898,810

(22) Filed: Oct. 6, 2010

(65) Prior Publication Data

US 2011/0081599 A1    Apr. 7, 2011

(30) Foreign Application Priority Data

Oct. 6, 2009   (KR) .................. 10-2009-0094679

(51) Int. Cl.
*H01M 4/02*   (2006.01)
*H01M 4/90*   (2006.01)

(52) U.S. Cl.
CPC .................................. *H01M 4/9058* (2013.01)
USPC ........... 429/525; 429/528; 429/523; 502/300; 502/327; 502/333; 502/339

(58) Field of Classification Search
CPC .................................................... H01M 4/9058
USPC ................. 429/525, 528, 523; 502/300, 327, 502/333, 339
See application file for complete search history.

(56) References Cited

U.S. PATENT DOCUMENTS

| | | | |
|---|---|---|---|
| 2007/0026292 A1* | 2/2007 | Adzic et al. | ..................... 429/44 |
| 2007/0212593 A1 | 9/2007 | Raiford et al. | |
| 2008/0038623 A1 | 2/2008 | Schmidt et al. | |
| 2008/0124603 A1 | 5/2008 | Han | |
| 2009/0042089 A1* | 2/2009 | Choi et al. | ..................... 429/40 |

FOREIGN PATENT DOCUMENTS

| | | |
|---|---|---|
| JP | 2006-511927 | 4/2006 |
| JP | 2007-294332 | 11/2007 |
| JP | 2007294332 A * | 11/2007 |
| KR | 10-2007-0015156 | 2/2007 |
| KR | 10-0797125 | 1/2008 |
| KR | 10-2008-0106470 | 12/2008 |
| WO | WO 2004/109837 | 12/2004 |
| WO | WO 2007/108950 | 9/2007 |

OTHER PUBLICATIONS

English Abstract for Korean Patent Publication No. 10-2002-0092996.

* cited by examiner

*Primary Examiner* — Zachary Best
(74) *Attorney, Agent, or Firm* — Cantor Colburn LLP (57) ABSTRACT

Non-platinum (Pt) electrode catalysts for fuel cells, methods of manufacturing the same, and fuel cells including the non-Pt electrode catalysts. Each of the non-Pt electrode catalysts for fuel cells includes at least palladium (Pd) and iridium (Ir), and further includes a metal, oxide of the metal, or mixture thereof for compensating for the activity of Pd and Ir.

13 Claims, 7 Drawing Sheets

ELECTRODE CATALYST FOR FUEL CELL COMPRISING PALLADIUM AND IRIDIUM, METHOD OF PREPARING ELECTRODE CATALYST, AND FUEL CELL USING ELECTRODE CATALYST

CROSS-REFERENCE TO RELATED APPLICATIONS

This application claims the benefit of Korean Patent Application No. 10-2009-0094679, filed on Oct. 6, 2009, in the Korean Intellectual Property Office, the disclosure of which is incorporated herein by reference.

BACKGROUND

1. Field

Aspects of the present disclosure relate to non-platinum based electrode catalysts for fuel cells, methods of preparing the same, and fuel cells using the non-platinum based electrode catalysts.

2. Description of the Related Art

Fuel cells can be classified into polymer electrolyte membrane fuel cells (PEMFCs), direct methanol fuel cells (DMFCs), phosphoric acid fuel cells (PAFCs), molten carbonate fuel cells (MCFCs), and solid oxide fuel cells (SOFCs), according to the types of electrolyte and fuel used in the fuel cells.

In general, PEMFCs and DMFCs include a membrane-electrode assembly (MEA) consisting of an anode, a cathode, and a polymer electrolyte interposed between the anode and the cathode. The anode includes a catalyst layer for catalyzing oxidation of a fuel. The cathode includes a catalyst layer for catalyzing reduction of an oxidant.

The catalyst layer of each of the anode and the cathode generally includes a catalyst that contains platinum (Pt) as an active component. However, since Pt is expensive, when fuel cells are produced in large quantities and thus a large amount of Pt is required, production costs are very high. Thus, production costs need to be reduced.

Thus, research into non-Pt based electrode catalysts and fuel cells including non-Pt based electrode catalysts and having high battery performance has been continuing.

SUMMARY

Provided are highly active non-platinum (Pt) based electrode catalysts for fuel cells, methods of preparing the same, and fuel cells including the non-Pt based electrode catalysts.

According to aspects of the present invention, an electrode catalyst for fuel cells includes palladium (Pd); iridium (Ir); and at least one metallic component selected from the group consisting of at least one metal (M) selected from the group consisting of manganese (Mn), gadolinium (Gd), indium (In), yttrium (Y), zirconium (Zr), tin (Sn), chromium (Cr), and vanadium (V), and an oxide of the metal (M).

According to aspects of the present invention, a method of preparing an electrode catalyst for fuel cells includes mixing a Pd precursor, an Ir precursor, a metal (M) precursor to prepare an electrode catalyst to obtain an electrode catalyst; adjusting the pH of the mixture; reducing the pH-adjusted mixture; washing and drying the reduced mixture; and heat treating the washed and dried product.

According to aspects of the present invention, a fuel cell includes the electrode catalyst for fuel cells; and an electrolyte membrane.

Additional aspects and or advantages of the invention will be set forth in part in the description which follows and, in part, will be apparent from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings, of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrode catalyst for fuel cells, according to an embodiment of the present invention, may be a non-platinum (Pt) based electrode catalyst, and includes at least palladium (Pd) and iridium (Ir) and further includes as a third metallic component at least one metal (M) selected from the group consisting of manganese (Mn), gadolinium (Gd), indium (In), yttrium (Y), zirconium (Zr), tin (Sn), chromium (Cr), and vanadium (V), an oxide of the metal, or a mixture thereof.

The electrode catalyst for fuel cells is represented by Formula 1 below:

$$Pd_5IrMO_x \qquad \text{Formula 1}$$

where M includes at least one metal selected from the group consisting of manganese (Mn), gadolinium (Gd), indium (In), yttrium (Y), zirconium (Zr), tin (Sn), chromium (Cr), and vanadium (V), and x is a number of 0 to 2.

$Pd_5IrMO_x$ of Formula 1 where x is a number of about 0 to about 2 refers to $Pd_5IrM$ alloy where x is 0, $Pd_5IrMO_x$ alloy where x is a number of 1 to 2, and a mixture thereof.

Pd and Ir are active components for inducing an oxygen reduction reaction, and the third metal promotes activity of the oxygen reduction reaction by changing the crystal structure or electron structure of Pd—Ir.

In the electrode catalyst, Pd forms an alloy together with Ir and the metal (M), and thus agglomeration of Pd particles may be prevented. In addition, the addition of the metal (M)

leads to more stable and higher catalyst activity than when an electrode catalyst includes only Pd and Ir.

In the electrode catalyst, Pd may form an alloy together with Ir and the metal oxide ($MO_x$) as described above, and alternatively, Pd may form an alloy together with Ir to form an alloy of Pd and Ir and then the formed alloy is mixed with the metal oxide ($MO_x$).

The metal (M) may be a mixture or alloy of the metals described above. The amount of at least one metallic component selected from the metal (M) and an oxide of the metal (M) may be in the range of about 5 to about 30 parts by weight based on 100 parts by weight of Pd.

The metal (M) may be Mn or In.

The amount of Ir may be in the range of about 5 to about 50 parts by weight based on 100 parts by weight of Pd.

When the amounts of at least one metallic component selected from the metal (M) and an oxide of the metal (M) and Ir are within the ranges described above, activity of the oxygen reduction reaction using the electrode catalyst is optimized.

According to an embodiment of the present invention, the electrode catalyst may include only $Pd_5IrMn$, $Pd_5IrIn$, $Pd_5IrCr$, $Pd_5IrGd$, $Pd_5IrY$, $Pd_5IrZr$, $Pd_5IrSn$, $Pd_5IrV$, $Pd_5Ir$ alloy-Mn oxide, $Pd_5Ir$ alloy-In oxide, $Pd_5Ir$ alloy-Cr oxide, $Pd_5Ir$ alloy-Gd oxide, $Pd_5Ir$ alloy-Y oxide, $Pd_5Ir$ alloy-Zr oxide, $Pd_5Ir$ alloy-Sn oxide, $Pd_5Ir$ alloy-V oxide, or a mixture thereof, without inclusion of a carbonaceous support.

According to another embodiment of the present invention, the electrode catalyst may include a carbonaceous support, and one selected from the group consisting of $Pd_5IrMn$, $Pd_5IrIn$, $Pd_5IrCr$, $Pd_5IrGd$, $Pd_5IrY$, $Pd_5IrZr$, $Pd_5IrSn$, $Pd_5IrV$, $Pd_5Ir$ alloy-Mn oxide, $Pd_5Ir$ alloy-In oxide, $Pd_5Ir$ alloy-Cr oxide, $Pd_5Ir$ alloy-Gd oxide, $Pd_5Ir$ alloy-Y oxide, $Pd_5Ir$ alloy-Zr oxide, $Pd_5Ir$ alloy-Sn oxide, $Pd_5Ir$ alloy-V oxide, and a mixture thereof, which is supported by the carbonaceous support.

The carbonaceous support may be selected from the group consisting of Ketjen black, carbon black, graphite carbon, carbon nanotubes, and carbon fiber.

The amount of the carbonaceous support may be in the range of about 50 to about 300 parts by weight based on 100 parts by weight of Pd. When the amount of the carbonaceous support is within the range described above, the electrode catalyst has excellent activity.

The electrode catalyst for fuel cells according to the present embodiment includes Pd and Ir. Thus, when the electrode catalyst is used in a fuel cell such as a polymer electrolyte membrane fuel cell (PEMFC), a phosphoric acid fuel cell (PAFC), or a direct methanol fuel cell (DMFC), the fuel cell has excellent electrode catalyst activity.

Fuel cells according to the present embodiment include a polymer electrolyte membrane disposed between an anode having a catalytic layer including the electrode catalyst and a cathode having a catalytic layer including the electrode catalyst.

In the anode, the following reaction takes place.

$$H_2 \rightarrow 2H^+ + 2e^-$$

$H^+$ produced from the reaction diffuses.

Meanwhile, in the cathode, the following oxygen reduction reaction (ORR) takes place.

$$2H^+ + 2e^- + \tfrac{1}{2}O_2 \rightarrow H_2O$$

In the electrode catalyst for fuel cells, if the electrode catalyst includes a catalyst metal supported by a carbonaceous support, the particle diameter of the catalyst metal may be in the range of about 2 nm to about 10 nm. When the catalyst metal has the particle diameter described above, excellent catalytic activity is obtained. The particle diameter of the catalyst metal can be determined by X-ray diffraction analysis.

Figure 1:
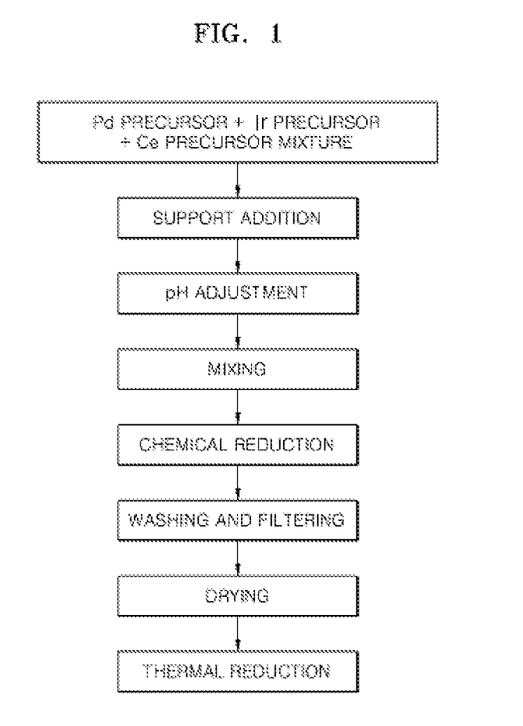
FIG. 1 is a schematic flowchart illustrating a method of preparing an electrode catalyst for fuel cells, according to an embodiment of the present invention.

FIG. 1 is a schematic flowchart illustrating a method of preparing an electrode catalyst for fuel cells, according to an embodiment of the present invention.

First, a Pd precursor, an Ir precursor, and a metal (M) precursor are dissolved in a solvent and then, if needed, a carbonaceous support is added thereto and the pH of the resultant mixture is adjusted.

Subsequently, the mixture is stirred.

Examples of the Pd precursor may include palladium (II) chloride, palladium (II) acetylacetonate, palladium (II) cyanide, palladium (II) acetate, palladium (II) sulfide, and palladium (II) nitrate.

Examples of the Ir precursor may include Ir chloride and Ir nitrate.

Examples of the metal (M) precursor may include a chloride of the metal (M) or a nitrate of the metal (M).

The amount of the metal (M) precursor may be in the range of about 5 to about 30 parts by weight based on 100 parts by weight of the Pd precursor.

The amount of the Ir precursor may be in the range of about 5 to about 50 parts by weight, based on 100 parts by weight of the Pd precursor.

The amount of the carbonaceous support may be in the range of about 50 to about 300 parts by weight based on 100 parts by weight of the Pd precursor.

The pH of the resultant mixture is adjusted to be in the range of about 10 to about 12. When a basic condition is reached, that is, the pH has been adjusted to be 7 or higher, impregnation of the precursor mixture into the carbonaceous support is smoothly performed.

The solvent may be water, ethanol, methanol, or ethylene glycol.

The amount of the solvent may be in the range of about 300 to about 500 parts by weight based on 100 parts by weight of the Pd precursor. When the amount of the solvent is within the range described above, components of the electrode catalyst are homogeneously dispersed and mixed.

The mixture is reduced by using a chemical reductant.

Examples of the reductant include $NaBH_4$, hydrazine, citric acid, and hydrogen. The amount of the reductant used may be in the range of about 1 mole to about 5 moles, based on 1 mole of the Pd precursor. When the amount of the reductant is within this range, the reduction reaction proceeds quickly.

The reaction product is then washed with water several times, filtered, dried, and then heat treated under a reducing condition, thereby completing the manufacture of the electrode catalyst for fuel cells.

The heat treatment may be performed using hydrogen as a reductant at a temperature of about 200 to about 400° C. for 1 to 3 hours.

The electrode catalyst for fuel cells may have a high catalytic activity as a result of being heat treated under the heat treatment conditions described above.

A fuel cell according to an embodiment of the present invention includes the electrode catalyst described above.

The fuel cell according to the present embodiment includes a cathode, an anode, and an electrolyte membrane disposed between the cathode and the anode, wherein at least one of the cathode and the anode contains the electrode catalyst as described above.

The electrode catalyst may be a supported catalyst including a carbonaceous support, or a catalyst that does not include a carbonaceous support.

For example, the supported catalyst may be used in the cathode.

The fuel cell may be, for example, a phosphoric acid fuel cell (PAFC), a polymer electrolyte membrane fuel cell (PEMFC), or a direct methanol fuel cell (DMFC).

Figure 6:
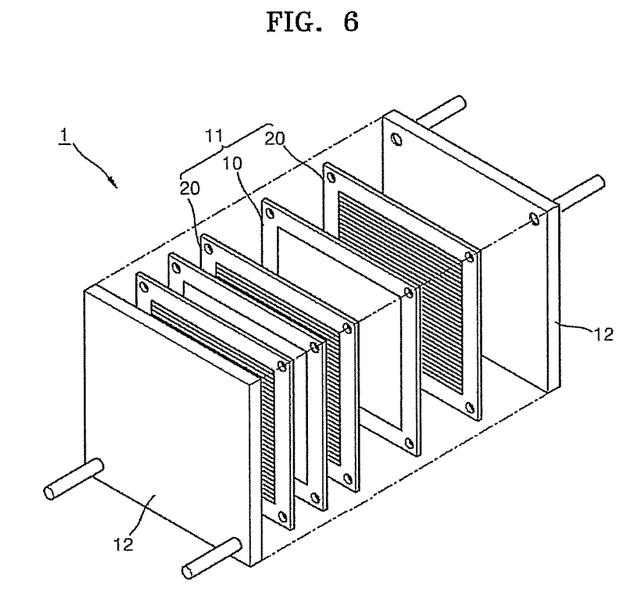
FIG. 6 is a perspective exploded view of a fuel cell according to an embodiment of the present invention.
Figure 7:
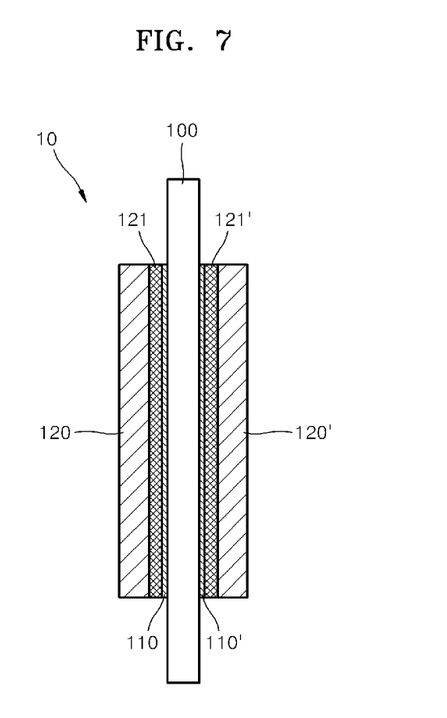
FIG. 7 is a cross-sectional view of an MEA included in the fuel cell of FIG. 6, according to an embodiment of the present invention.

FIG. 6 is a perspective exploded view of a fuel cell 1 according to an embodiment of the present invention, and FIG. 7 is a cross-sectional view of a membrane-electrode assembly (MEA) of the fuel cell 1 of FIG. 6.

Referring to FIG. 6, the fuel cell 1 according to the present embodiment includes two unit cells 11 interposed between a pair of holders 12. Each unit cell 11 includes an MEA 10, and a pair of bipolar plates 20 respectively disposed on both sides of the MEA 10. The bipolar plates 20 include a conductive metal, carbon or the like, and function as current collectors, while providing oxygen and fuel to the catalytic layers of the MEAs 10.

Although only two unit cells 11 are shown in FIG. 6, the number of unit cells is not limited to two and a fuel cell may have several tens or hundreds of unit cells, depending on the required properties of the fuel cell.

Referring to FIG. 7, each MEA 10 includes an electrolyte membrane 100, catalytic layers 110 and 110' respectively disposed on either side of the electrolyte membrane 100 in the thickness direction thereof, first gas diffusion layers 121 and 121' respectively stacked on the catalytic layers 110 and 110', and second gas diffusion layers 120 and 120' respectively stacked on the first gas diffusion layers 121 and 121'.

The catalytic layers 110 and 110' function as a fuel electrode and an oxygen electrode each including a catalyst and a binder, and may further include a material that can increase the electrochemical surface area of the catalyst.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 and 120' diffuse oxygen and fuel supplied through the bipolar plates 20 to the entire surface of the catalytic layers 110 and 110'.

The fuel cell 1 including the MEAs 10 operates at a temperature of 100 to 300° C. Fuel such as hydrogen is supplied through one of the bipolar plates 20 into a first catalytic layer, and an oxidant such as oxygen is supplied through the other bipolar plate 20 into a second catalytic layer. Then, hydrogen is oxidized into protons in the first catalytic layer, and the protons are conducted to the second catalytic layer through the electrolyte membrane. Then, the protons electrochemically react with oxygen in the second catalytic layer to produce water and generate electrical energy. Moreover, hydrogen supplied as a fuel may be hydrogen produced by reforming hydrocarbons or alcohols. Oxygen supplied as an oxidant may be supplied in the form of air.

Hereinafter, one or more embodiments of the present invention will be described in detail with reference to the following examples. These examples are not intended to limit the purpose and scope of the one or more embodiments of the present invention.

In Examples 1-8 below, $Pd_5IrMO_x$ of Formula 1 where x is a number of about 0 to about 2 and M is Mn, In, Zr, Sn, V, Y, Cr, or Gd refers to $Pd_5IrM$ alloy where x is 0, $Pd_5IrMO_x$ alloy where x is a number of 1 to 2, or a mixture thereof.

EXAMPLE 1

Preparation of $Pd_5IrMnO_x/C$ where x is a Number of 0 to 2

0.4 g of iridium chloride and 0.5 g of manganese nitrate were added to 200 g of a 1M aqueous solution prepared by dissolving 1.5 g of palladium nitrate ($Pd(NO_3)_2 \cdot XH_2O$) in water. Then, 0.5 g of Ketjen black as a carbonaceous support was added thereto to prepare a mixture.

The pH of the mixture was adjusted to be in a basic condition by dropping 1M sodium hydroxide solution thereto and then the resultant mixture was reduced by adding 1 g of $NaBH_4$ thereto and then the reduced mixture was further stirred for 12 hours. The resulting solid was washed several times with water, filtered and dried at 120° C. under a nitrogen atmosphere.

Then, the resulting solid was heat treated under a hydrogen atmosphere at a temperature of 300° C., thereby preparing $Pd_5IrMnO_x/C$ where x is a number of about 0 to about 2 as an electrode catalyst for fuel cells.

The mixture ratio of metals constituting $Pd_5IrMnO_x/C$ where x is a number of about 0 to about 2 can be identified by inductively coupled plasma (ICP) analysis.

EXAMPLE 2

Preparation of $Pd_5IrInO_x/C$ where x is a Number of about 0 to about 2

$Pd_5IrInO_x/C$ where x is a number of about 0 to about 2 was prepared in the same manner as Example 1, except that 0.5 g of indium chloride was added to the mixture instead of manganese nitrate.

EXAMPLE 3

Preparation of $Pd_5IrZrO_x/C$ where x is a Number of about 0 to about 2

$Pd_5IrZrO_x/C$ where x is a number of about 0 to about 2 was prepared in the same manner as Example 1, except that 0.5 g of zinc nitrate was added to the mixture instead of manganese nitrate.

EXAMPLE 4

Preparation of $Pd_5IrSnO_x/C$ where x is a Number of about 0 to about 2

$Pd_5IrSnO_x/C$ where x is a number of about 0 to about 2 was prepared in the same manner as Example 1, except that 0.5 g of tin chloride was added to the mixture instead of manganese nitrate.

EXAMPLE 5

Preparation of $Pd_5IrVO_x/C$ where x is a Number of about 0 to about 2

$Pd_5IrVO_x/C$ where x is a number of about 0 to about 2 was prepared in the same manner as Example 1, except that 0.5 g of a vanadium ammonium salt was added to the mixture instead of manganese nitrate.

EXAMPLE 6

Preparation of $Pd_5IrYO_x/C$ where x is a Number of about 0 to about 2

$Pd_5IrYO_x/C$ where x is a number of about 0 to about 2 was prepared in the same manner as Example 1, except that 0.5 g of yttrium nitrate was added to the mixture instead of manganese nitrate.

EXAMPLE 7

Preparation of $Pd_5IrCrO_x/C$ where x is a Number of about 0 to about 2

$Pd_5IrCrO_x/C$ where x is a number of about 0 to about 2 was prepared in the same manner as Example 1, except that 0.5 g of chromium chloride was added to the mixture instead of manganese nitrate.

EXAMPLE 8

Preparation of $Pd_5IrGdO_x/C$ where x is a Number of about 0 to about 2

$Pd_5IrGdO_x/C$ where x is a number of about 0 to about 2 prepared in the same manner as Example 1, except that 0.5 g of gadolinium nitrate was added to the mixture instead of manganese nitrate.

COMPARATIVE EXAMPLE 1

Preparation of $Pd_3CO_1/C$ 0.5 g of $CoCl_2.6H_2O$ as a Co precursor was added to 200 g of a 1M aqueous solution prepared by dissolving 1.0 g of hydrated Pd nitrate ($Pd(NO_3)_2.XH_2O$) in water, and then 0.5 g of Ketjen black as a carbonaceous support was added thereto to prepare a mixture.

The pH of the mixture was adjusted to be in a basic condition by dropping 1M sodium hydroxide solution thereto and then the resultant mixture was reduced by adding 1 g of $NaBH_4$ thereto and then the reduced mixture was further stirred for 12 hours. The resulting solid was washed several times with water, and dried at 120° C. under a nitrogen atmosphere.

Then, the resulting solid product was heat treated at 300° C. under a hydrogen gas atmosphere to produce $Pd_3CO_1/C$ as an electrode catalyst.

COMPARATIVE EXAMPLE 2

Preparation of Pd/C

Pd/C was manufactured in the same manner as in Comparative Example 1, except that $CoCl_2.6H_2O$ was not added to the mixture.

COMPARATIVE EXAMPLE 3

Preparation of $Pd_5Ir/C$ $Pd_5Ir/C$ was manufactured in the same manner as in Comparative Example 1, except that $CoCl_2.6H_2O$ was not added to the mixture, but 0.4 g of iridium chloride was added to the mixture.

Composition ratios of the electrode catalysts manufactured according to Examples 1-8 and Comparative Examples 1-3 were analyzed using inductively coupled plasma (ICP). The results are shown in Table 1. Referring to Table 1, an average particle diameter of the electrode catalysts varies according to the types of metal included and is in the range of about 4 nm to about 7 nm.

TABLE 1

| Catalyst | | ICP metal amount (wt %) | | |
| --- | --- | --- | --- | --- |
| | | Pd | Ir | M |
| Comparative Example 1 | $Pd_3Co/C$ | 44.0 | — | 8.9 |
| Comparative Example 2 | Pd/C | 50.5 | — | — |
| Comparative Example 3 | $Pd_5Ir/C$ | 33.3 | 14.0 | — |
| Example 1 | $Pd_5IrMnO_x/C$ (x = 0 to 2) | 35.8 | 12.9 | 6.5 |
| Example 2 | $Pd_5IrInO_x/C$ (x = 0 to 2) | 33.3 | 12.9 | 11.8 |
| Example 3 | $Pd_5IrZrO_x/C$ (x = 0 to 2) | 32.2 | 12.2 | 10.0 |
| Example 4 | $Pd_5IrSnO_x/C$ (x = 0 to 2) | 34.0 | 9.0 | 4.4 |
| Example 5 | $Pd_5IrVO_x/C$ (x = 0 to 2) | 37.9 | 12.5 | 1.0 |
| Example 6 | $Pd_5IrYO_x/C$ (x = 0 to 2) | 33.9 | 12.2 | 7.3 |
| Example 7 | $Pd_5IrCrO_x/C$ (x = 0 to 2) | 36.1 | 13.0 | 4.4 |
| Example 8 | $Pd_5IrGdO_x/C$ (x = 0 to 2) | 31.1 | 11.5 | 9.7 |

Figure 2:
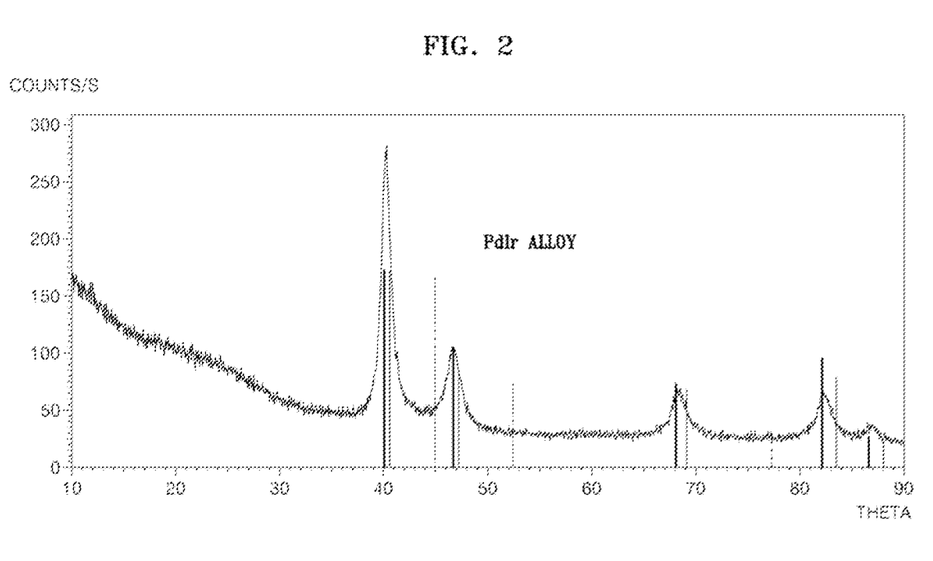
FIGS. 2 and 3 are graphs illustrating results of X-ray diffraction analysis on $Pd_5IrMnO_x/C$ where x is a number of about 0 to about 2 manufactured according to Example 1 and $Pd_5IrInOx/C$ where x is a number of about 0 to about 2 manufactured according to Example 2.
Figure 3:
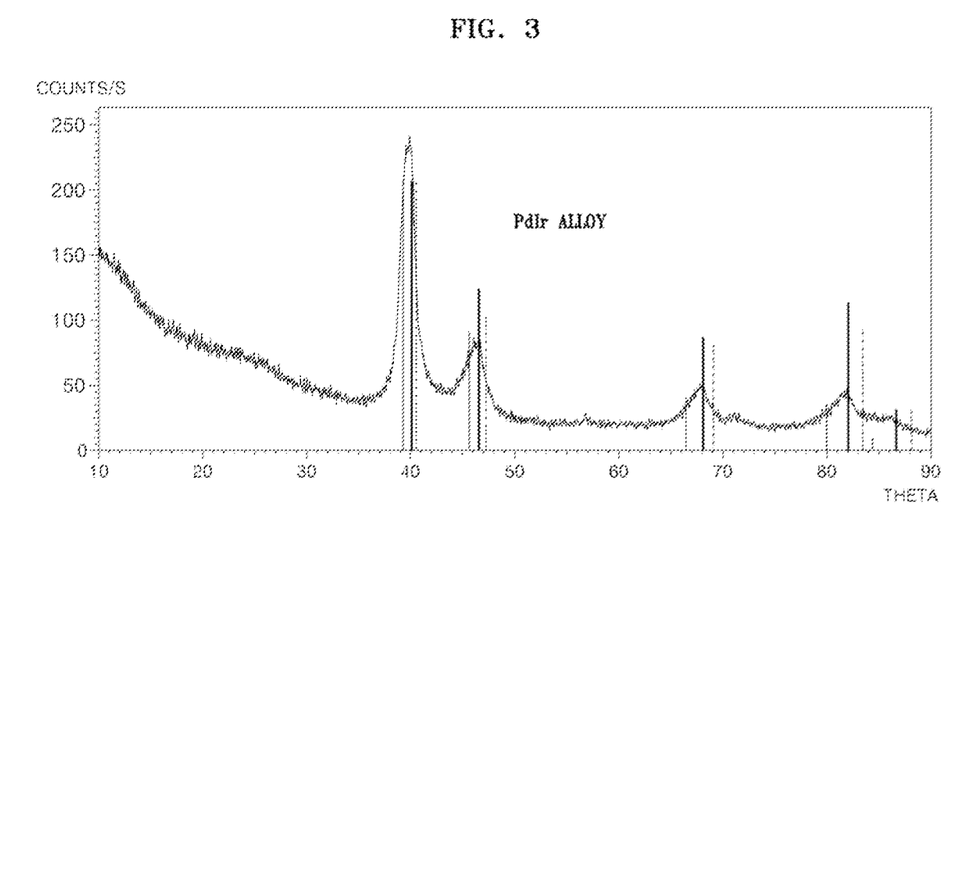

X-ray diffraction analysis was performed on $Pd_5IrMnO_x/C$ where x is a number of about 0 to about 2 manufactured according to Example 1 and $Pd_5IrInO_x/C$ where x is a number of about 0 to about 2 manufactured according to Example 2. The results are shown in FIGS. 2 and 3. As a result of X-ray diffraction analysis, particle diameters of $Pd_5IrMn$ and $Pd_5IrIn$ are respectively about 6.5 nm and about 4.6 nm.

Referring to FIGS. 2 and 3, formation of alloys of the compounds described above can be observed.

PREPARATION EXAMPLE 1

Preparation of Electrode

Figure 4:
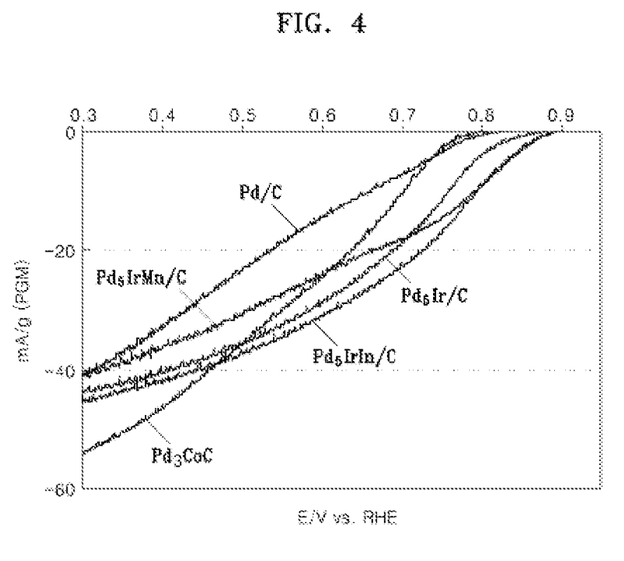
FIG. 4 is a graph of oxygen reduction reaction (ORR) activity of electrodes manufactured according to Preparation Examples 1 and 2 and Comparative Preparation Examples 1 through 3.

For each 1 g of $Pd_5IrMnO_x/C$ where x is a number of 0 to 2 synthesized in Example 1, 0.1 g of polyvinylidene fluoride (PVDF) and n-methylpyrrolidone (NMP) were mixed to produce a rotating disk electrode (RDE) forming slurry. The slurry was loaded onto a glassy carbon film used as a substrate of the RDE, and then a drying process was performed therein while incrementally increasing the temperature from room temperature to about 150° C. to produce the RDE. Using the produced RDE as a working electrode, performance of the electrode catalyst was evaluated as described below. The results are shown in FIG. 4.

PREPARATION EXAMPLE 2

Preparation of Electrode

An electrode was manufactured using the same method as Preparation Example 1, except that the electrode catalyst of Example 2 was used instead of the electrode catalyst of Example 1.

COMPARATIVE PREPARATION EXAMPLES 1-3

Preparation of Electrodes

Electrodes were manufactured using the same method as Preparation Example 1, except that the electrode catalysts of Comparative Examples 1-3 were used instead of the electrode catalyst of Example 1.

ORR activity of the electrodes of Preparation Examples 1 and 2 and Comparative Preparation Examples 1 through 3 was measured as described below. The results are shown in FIG. 4. In this regard, the scanning rate was about 1 mV/s at 900 rpm.

Evaluation of ORR Activity

While rotating an electrode in 0.1M $HClO_4$ electrolyte saturated with oxygen (rpm: 900) and changing voltage at a scanning rate of 1 mV/s, an ORR current was measured in the voltage region from the open circuit voltage (OCV) to about 0.3V. ORR activity was evaluated by comparing absolute values of current at a battery operating voltage ranging from about 0.75 V to about 0.8 V. As the absolute values of current was greater at the battery operating voltage ranging from about 0.75 V to about 0.8 V, the ORR activity was better.

Referring to FIG. 4, it can be seen that the electrodes of Preparation Examples 1 and 2 had more active oxygen reduction than the electrodes of Comparative Preparation Examples 1-3.

That is, in FIG. 4, the y axis represents a normalized current based on the unit weight g of catalyst, the x axis represents a voltage which is adjusted when used in a normal hydrogen electrode (RHE), $Pd_5IrMnO_x/C$ where x is a number of about 0 to about 2 represents the electrode of Preparation Example 1, $Pd_5IrInO_x/C$ where x is a number of about 0 to about 2 represents the electrode of Preparation Example 2, Pd/C represents the electrode of Comparative Preparation Example 2, $Pd_3Co/C$ represents the electrode of Comparative Preparation Example 1, and $Pd_5Ir/C$ represents the electrode of Comparative Preparation Example 3.

PREPARATION EXAMPLE 3

Preparation and Evaluation of Fuel Cell

For each 1 g of $Pd_5IrMnO_x/C$ where x is a number of 0 to 2 synthesized in Example 1, 0.03 g of polyvinylidene fluoride (PVDF) and an adequate amount of solvent (NMP) were mixed to produce a cathode-forming slurry. The cathode-forming slurry was coated using a bar coater on a carbon paper coated with a microporous layer. The coated slurry was then subjected to a drying process involving increasing the temperature incrementally from room temperature to 150° C. to produce a cathode. The loading amount of the catalyst in the cathode was adjusted to be in the range of 1.5 to 2.0 mg/cm².

Separately, an anode was manufactured using PtRu/C catalyst, and the loading amount of the PtRu/C catalyst in the anode was in the range of about 0.8 mg/cm².

An MEA was prepared using poly(2,5-benzimidazole) doped with 85% phosphoric acid as an electrolyte membrane between the cathode and the anode.

Figure 5:
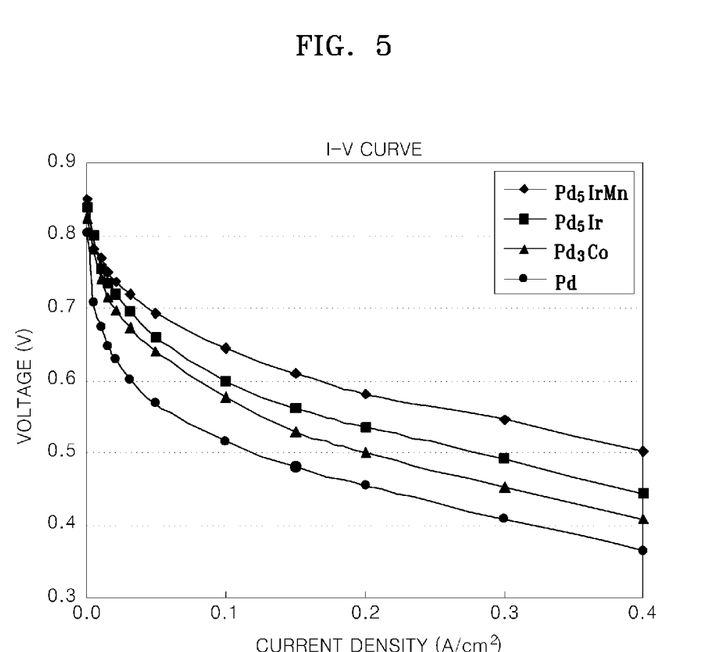
FIG. 5 is a graph illustrating performance of a membrane electrode assembly (MEA) of fuel cells manufactured according to Preparation Example 3 and Comparative Preparation Examples 4 through 6.

Then, performance of the MEA was evaluated at 150° C. using dry air for the cathode and dry hydrogen for the anode at 150° C. The results are shown in FIG. 5.

COMPARATIVE PREPARATION EXAMPLES 4-6

Preparation of Fuel Cells

Fuel cells were manufactured using the same method as Preparation Example 3, except that the electrode catalysts of Comparative Examples 1-3 were used instead of the electrode catalyst of Example 1.

The fuel cells using the electrode catalysts of Comparative Examples 1-3 were measured using the same evaluation method as used in Preparation Example 3. The results are shown in FIG. 5. Referring to FIG. 5, PdIrMn represents results when the fuel cell of Preparation Example 3 was used, PdCo represents results when the fuel cell of Comparative Preparation Example 4 was used, Pd represents results when the fuel cell of Comparative Preparation Example 5 was used, and PdIr represents results when the fuel cell of Comparative Preparation Example 6 was used.

Referring to FIG. 5, OCVs, which are related to the oxygen reduction reaction onset potential of a catalyst. The OCVs of the fuel cells of Preparation Example 3 and Comparative Preparation Examples 4-6 were compared and it was found that the fuel cell of Preparation Example 3 in which Ir and Mn were simultaneously added to Pd had high oxygen reduction reaction onset potentials, and better MEA performance than the fuel cells of Comparative Preparation Examples 4-6.

Electrode catalysts according to the above embodiments of the present invention, that is, Pd and Ir-containing non-Pt based electrode catalysts for fuel cells are stable, and have high oxygen reduction activity. Fuel cells including electrodes including such electrode catalysts have high efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode catalyst for fuel cells, the electrode catalyst comprising:
   palladium (Pd);
   iridium (Ir); and
   at least one metallic or metal oxide component selected from the group consisting of at least one metal (M) selected from the group consisting of manganese (Mn), gadolinium (Gd), indium (In), yttrium (Y), zirconium (Zr), tin (Sn), chromium (Cr), and vanadium (V), and an oxide of the metal (M)
   wherein the electrode catalyst is represented by Formula 1:

$Pd_5IrMO_x$  Formula 1 where M is the at least one metal (M) and x is a number of 0 to 2.

2. The electrode catalyst of claim 1, wherein the at least one metallic or metal oxide component comprises Mn, In, an oxide thereof, or a mixture thereof.

3. The electrode catalyst of claim 1, wherein the electrode catalyst comprises a carbonaceous support.

4. The electrode catalyst of claim 3, wherein the carbonaceous support is selected from the group consisting of Ketjen black, carbon black, graphite carbon, carbon nanotubes, and carbon fiber.

5. The electrode catalyst of claim 3, wherein the amount of the carbonaceous support is in the range of about 50 to about 300 parts by weight based on 100 parts by weight of Pd.

6. A method of preparing an electrode catalyst for fuel cells, the method comprising:
   mixing a Pd precursor, an Ir precursor, and a metal (M) precursor to prepare an electrode catalyst;
   adjusting the pH of the mixture;
   reducing the pH-adjusted mixture;
   washing, drying and filtering the reduced mixture; and
   heat treating the washed and dried product
   wherein the electrode catalyst is represented by Formula 1:

$Pd_5IrMO_x$  Formula 1 where M is the at least one metal (M) and x is a number of 0 to 2.

7. The method of claim 6, further comprising adding a carbonaceous support in the mixing step.

8. The method of claim 6, wherein the heat treating is performed at a temperature of about 200 to about 400° C.

9. The method of claim 6, wherein the pH of the mixture is adjusted to be in the range of about 10 to about 12.

10. A fuel cell comprising the electrode catalyst of claim 1 and an electrolyte membrane.

11. The fuel cell of claim 10, wherein the electrode is a cathode.

12. The fuel cell of claim 10, wherein the at least one metallic or metal oxide component in the electrode catalyst is Mn, In, an oxide thereof, or a mixture thereof.

13. The fuel cell of claim 10, wherein the electrode catalyst further comprises a carbonaceous support.

* * * * *